(12) United States Patent
Nilsen et al.

(10) Patent No.: US 8,033,671 B1
(45) Date of Patent: Oct. 11, 2011

(54) RETROREFLECTIVE STRUCTURES HAVING A HELICAL GEOMETRY

(75) Inventors: Robert B. Nilsen, Mystic, CT (US);
Garrett L. Nilsen, Mystic, CT (US)

(73) Assignee: Technology Solutions & Invention LLC, Mystic, CT (US)

( * ) Notice: Subject to any disclaimer, the term of this patent is extended or adjusted under 35 U.S.C. 154(b) by 466 days.

(21) Appl. No.: 12/228,227

(22) Filed: Aug. 11, 2008

Related U.S. Application Data

(60) Provisional application No. 61/031,195, filed on Feb. 25, 2008, provisional application No. 60/955,235, filed on Aug. 10, 2007.

(51) Int. Cl.
*G02B 5/122* (2006.01)
(52) U.S. Cl. .......................... 359/529; 359/530
(58) Field of Classification Search .................. 359/529, 359/530; 385/100, 102, 104, 133, 146, 901; 362/615, 623, 624, 627, 551, 559, 560, 346–348
See application file for complete search history.

(56) References Cited

U.S. PATENT DOCUMENTS

| 3,382,655 | A | | 5/1968 | Wasserman |
| 3,689,346 | A | | 9/1972 | Rowland |
| 3,744,117 | A | * | 7/1973 | Heenan et al. .................. 29/416 |
| 4,336,092 | A | | 6/1982 | Wasserman |
| 4,576,850 | A | | 3/1986 | Martens |
| 4,697,407 | A | | 10/1987 | Wasserman |
| 6,337,946 | B1 | * | 1/2002 | McGaffigan .................. 385/146 |
| 7,502,534 | B2 | * | 3/2009 | Lee et al. ......................... 385/31 |
| 2004/0190102 | A1 | * | 9/2004 | Mullen et al. ................. 359/237 |

* cited by examiner

*Primary Examiner* — Frank Font
(74) *Attorney, Agent, or Firm* — Onello & Mello, LLP

(57) ABSTRACT

Retroreflective structures and methods of forming the same comprise a body of material extending along a helical path about a longitudinal axis and a plurality of retroreflective optical elements positioned along the helical path of the body of material, and constructed and arranged to retroreflect electromagnetic energy directed from a range of angular orientations about the longitudinal axis.

42 Claims, 7 Drawing Sheets

I-I'

II-II'

RETROREFLECTIVE STRUCTURES HAVING A HELICAL GEOMETRY

RELATED APPLICATIONS

This application claims the benefit of U.S. Provisional Patent Application No. 60/955,235, filed Aug. 10, 2007, and U.S. Provisional Patent Application No. 61/031,195, filed Feb. 25, 2008, the content of each being incorporated herein by reference in its entirety.

BACKGROUND OF THE INVENTION

Conventional retroreflective fibers, threads, yarns, and the like that are used in fabrics are generally formed using a binder to attach glass bead retroreflectors to the surface of natural or synthetic fibers from which the threads, yarns, and the like are formed. However, since a fiber, thread, yarn, and the like has glass bead retroreflectors exposed on its surface, this configuration offers little protection against abrasion and degradation of the retroreflectors. Further, the fabrics and materials to which the retroreflectors are attached tend to have low levels of retroreflectivity, and the retroreflectors themselves have limited life expectancies with regard to effectiveness. Also, exposed glass bead retroreflectors can also abrade textile manufacturing equipment, and can also degrade the fabric material to which the retroreflectors are attached. In addition, exposed glass bead retroreflectors can lose their retroreflective properties when wet. In addition, conventional glass retroreflectors or lenses are randomly attached to the fabrics and materials, and are of different and random shapes and sizes, further reducing the effectiveness of the retroreflectors.

Another conventional approach includes forming retroreflective threads or yarns by attaching glass beads, which are optionally metalized with a reflective coating, to a sheet of material, and then slitting, dicing, or cutting the sheet of material into narrow strips of material.

In some applications, two sheets of material are attached to each other, wherein each sheet has a first surface that includes attached glass bead retroreflectors, and a second surface that is free of glass bead retroreflectors, wherein the second surfaces of the two sheets of material are attached to each other, for example, by being laminated back-to-back. In this manner, glass bead retroreflectors are exposed on both sides of the combined sheets of material. The combined sheets are then slit, diced, or cut into narrow strips of material. In another approach, glass bead retroreflectors are adhered with a binder to both sides of the same sheet of material, and the sheet is slit, diced, or cut into narrow strips of material.

Another conventional approach is to form corner cube retroreflectors on a sheet of material, metalize the corner cube retroreflectors, and then slit the sheet of material to form strips of single-sided corner cube films. Often, two strips of the metalized corner cube films are attached to each other, back-to-back, followed by slitting the combined strips of corner cube films into narrow widths to form a two-sided retroreflective fiber.

Such conventional methods of forming retroreflective fibers are described, for example, in U.S. Pat. No. 4,576,850, issued Mar. 18, 1986, entitled "Shaped Plastic Articles Having Replicated Microstructure Surfaces," and as described in U.S. Pat. No. 3,689,346, issued Sep. 5, 1972, entitled "Method for Producing Retroreflective Material," the content of each being incorporated herein by reference in its entirety.

However, conventional retroreflective fibers include non-retroreflecting edges, which can change the appearance of the fiber. In addition, such conventional retroreflective fibers do not include a reinforcing inner layer, causing the fibers to be insufficiently fragile. As such, it is undesirable to use conventional retroreflective fibers to form fabrics by sewing, knitting, embroidering, and the like.

SUMMARY OF THE INVENTION

Embodiments of the present specification are directed to retroreflective structures and methods for forming such retroreflective structures. An improved method of forming reflective products using retroreflective threads, yarns, or fibers to provide improved retroreflection, appearance and wet-weather performance is provided. Also provided are fibers and fiber systems having retroreflective structures, wherein such fibers and fiber systems have superior retroreflection properties, including but not limited to, brightness, entrance angles and durability.

In an aspect, a retroreflective structure comprises a body of material extending along a helical path about a longitudinal axis; and a plurality of retroreflective optical elements arranged in a periodic array, and positioned along the helical path of the body of material, and constructed and arranged to retroreflect electromagnetic energy directed from a range of angular orientations about the longitudinal axis.

In an embodiment, at least one retroreflective optical element of the plurality of retroreflective optical elements includes a corner cube structure. In another embodiment, at least one retroreflective optical element of the plurality of retroreflective optical elements includes a resonant structure. In another embodiment, the plurality of retroreflective optical elements include at least one of corner cubes and cats' eyes.

In an embodiment, the plurality of retroreflective optical elements are constructed and arranged to retroreflect electromagnetic energy at optical wavelengths.

In an embodiment, the body is constructed and arranged to be at least partially transparent to incident electromagnetic energy.

In an embodiment, the retroreflective structure further comprises a reflective coating on at least one of the retroreflective optical elements. In another embodiment, the reflective coating is a wavelength-selective optical coating.

In an embodiment, the retroreflective structure further comprises a core along the longitudinal axis, wherein the body of material including the optical elements is positioned along the helical path about the core. In another embodiment, the core comprises a metal wire, polymer fiber, or fabric type textile fiber. In another embodiment, the core comprises a non-clad fiber-optic light-piping thread.

In an embodiment, the plurality of retroreflective optical elements comprise corner cube structures, and wherein the periodic array of plurality of retroreflective optical elements are constructed and arranged so that proud apexes of the corner cube structures are oriented toward the core.

In an embodiment, the retroreflective structure further comprises a hollow core along the longitudinal axis, wherein the body of material including the optical elements surrounds the hollow core, and is positioned along the helical path about the core. In other embodiment, the hollow core comprises a metal or polymer hollow tube.

In an embodiment, the retroreflective structure further comprises a cladding on the body of material.

In an embodiment, the range of angular orientations comprises up to 360 degrees about the longitudinal axis.

In an embodiment, the body of material is treated to have a wavelength-selective color.

In an embodiment, the retroreflective structure further comprises an upper layer on the body of material and the retroreflective optical elements. In another embodiment, the upper layer has a textured or micro-structured surface.

In an embodiment, the upper layer is along a helical path about the longitudinal axis.

In an embodiment, the helical path along which the upper layer is positioned is the same as or similar to the helical path along which the body of material and the retroreflective optical elements are positioned. In another embodiment, the helical path along which the upper layer is positioned differently than the helical path along which the body of material and the retroreflective optical elements are positioned.

In an embodiment, neighboring helical loops of the body of material abut or overlap each other. In another embodiment, neighboring helical loops of the body of material are spaced apart from each other. In another embodiment, first neighboring loops are spaced apart by a first distance and second neighboring loops are spaced apart by a second distance, wherein the first distance and the second distance are not equal.

In an embodiment, the body of material including the plurality of optical elements comprises at least two strips of retroreflective material, wherein a first strip of retroreflective material is along a first helical path about the longitudinal axis and a second strip of retroreflective material is along a second helical path about the longitudinal axis. In an embodiment, the first and second helical paths are the same or similar helical paths. In another embodiment, the first and second helical paths are different helical paths.

In an embodiment, the retroreflective structure comprises a composite retroreflective structure that includes two strips of retroreflective material that are laminated together, back-to-back, wherein unlaminated sides of the two strips of retroreflective materials comprise a first side and a second side of the composite retroreflective structure, so that electromagnetic energy that is incident at either the first side or the second side of the composite retroreflective structure is retroreflected by the structure.

In an embodiment, the plurality of retroreflective optical elements are positioned between the body of material and the longitudinal axis so that incident electromagnetic energy penetrates the body, is retroreflected by the plurality of retroreflective optical elements, and exits the body as retroreflected electromagnetic energy.

In an embodiment, the plurality of retroreflective optical elements comprise corner cube structures and wherein the periodic array of plurality of retroreflective optical elements are constructed and arranged so that proud apexes of the corner cube structures are oriented toward the longitudinal axis.

In an embodiment, the retroreflective structure is heat set.

In another aspect, a method of forming a retroreflective structure comprises forming a body of material including a plurality of retroreflective optical elements, the retroreflective optical elements arranged in a periodic array; and extending the body of material along a helical path about a longitudinal axis so that the retroreflective optical elements are positioned along the helical path to retroreflect electromagnetic energy that is directed from a range of angular orientations about the longitudinal axis.

In an embodiment, the body of material is constructed by heating the body of material to a temperature that is slightly above its glass transition temperature, then reducing the temperature of the body of material.

In an embodiment, at least one retroreflective optical element of the plurality of retroreflective optical elements includes a corner cube structure. In another embodiment, at least one retroreflective optical element of the plurality of retroreflective optical elements includes a resonant structure. In another embodiment, the retroreflective optical elements include at least one of corner cubes and cats' eyes.

In an embodiment, the plurality of retroreflective optical elements are constructed and arranged to retroreflect electromagnetic energy at optical wavelengths.

In an embodiment, the body is constructed and arranged to be at least partially transparent to incident electromagnetic energy.

In an embodiment, a reflective coating is formed on at least one of the retroreflective optical elements. In an embodiment, the reflective coating is a wavelength-selective optical coating.

In an embodiment, a core is formed along the longitudinal axis, wherein the body of material including the retroreflective optical elements is positioned along the helical path about the core.

In an embodiment, the core comprises a metal wire, polymer fiber, or fabric type textile fiber. In an embodiment, the core comprises a non-clad fiber-optic light-piping thread.

In an embodiment, the plurality of retroreflective optical elements comprise corner cube structures, and wherein the periodic array of plurality of retroreflective optical elements are constructed and arranged so that proud apexes of the corner cube structures are oriented toward the core.

In an embodiment, a hollow core is formed along the longitudinal axis, and wherein extending the body of material along the helical path comprises extending the body of material including the retroreflective optical elements about the hollow core, and along the helical path. In an embodiment, the hollow core comprises a metal or polymer hollow tube.

In an embodiment, a cladding is formed on the body of material.

In an embodiment, the range of angular orientations comprises up to 360 degrees about the longitudinal axis.

In an embodiment, the body of material is treated to have a wavelength-selective color.

In an embodiment, an upper layer is formed on the body of material and the retroreflective optical elements. In an embodiment, the upper layer has a textured or micro-structured surface. In an embodiment, the upper layer is along a helical path about the longitudinal axis. In an embodiment, the helical path along which the upper layer is positioned is the same as or similar to the helical path along which the body of material and the retroreflective optical elements are positioned.

In an embodiment, the helical path along which the upper layer is positioned differently than the helical path along which the body of material and the retroreflective optical elements are positioned.

In an embodiment, neighboring helical loops of the body of material abut or overlap each other.

In an embodiment, wherein neighboring helical loops of the body of material are spaced apart from each other. In an embodiment, first neighboring loops are spaced apart by a first distance and second neighboring loops are spaced apart by a second distance, wherein the first distance and the second distance are not equal.

In an embodiment, the body of material including the plurality of optical elements comprises at least two strips of retroreflective material, wherein a first strip of retroreflective material is along a first helical path about the longitudinal axis and a second strip of retroreflective material is along a second helical path about the longitudinal axis.

In an embodiment, the first and second helical paths are the same or similar helical paths. In another embodiment, the first and second helical paths are different helical paths.

In an embodiment, the retroreflective structure comprises a composite retroreflective structure that includes two strips of retroreflective material that are laminated together, back-to-back, wherein unlaminated sides of the two strips of retroreflective materials comprise a first side and a second side of the composite retroreflective structure, so that electromagnetic energy that is incident at either the first side or the second side of the composite retroreflective structure is retroreflected by the structure.

In an embodiment, extending the body of material along the helical path about the longitudinal axis comprises: positioning the body of material about a core; heat setting the body of material; cooling the body of material; and removing the body of material from the core.

In an embodiment, heat setting the body of material comprises raising the temperature of the body of material to a temperature that is slightly higher than its glass transition temperature.

In an embodiment, the plurality of retroreflective optical elements are positioned between the body of material and the longitudinal axis so that incident electromagnetic energy penetrates the body, is retroreflected by the plurality of retroreflective optical elements, and exits the body as retroreflected electromagnetic energy.

In an embodiment, the plurality of retroreflective optical elements comprise corner cube structures and wherein the periodic array of plurality of retroreflective optical elements are constructed and arranged so that proud apexes of the corner cube structures are oriented toward the longitudinal axis.

In an embodiment, the retroreflective structure is heat set.

BRIEF DESCRIPTION OF THE DRAWINGS

The foregoing and other objects, features, and advantages of the embodiments of the present invention will become more apparent to those of ordinary skill in the art from the particular descriptions of embodiments of the invention, as illustrated in the accompanying drawings in which like reference numerals refer to the same or similar elements throughout the different views. The drawings are not necessarily to scale, emphasis instead being placed upon illustrating the principles of the disclosure. In the drawings.

DETAILED DESCRIPTION OF EMBODIMENTS

Figure 1A:
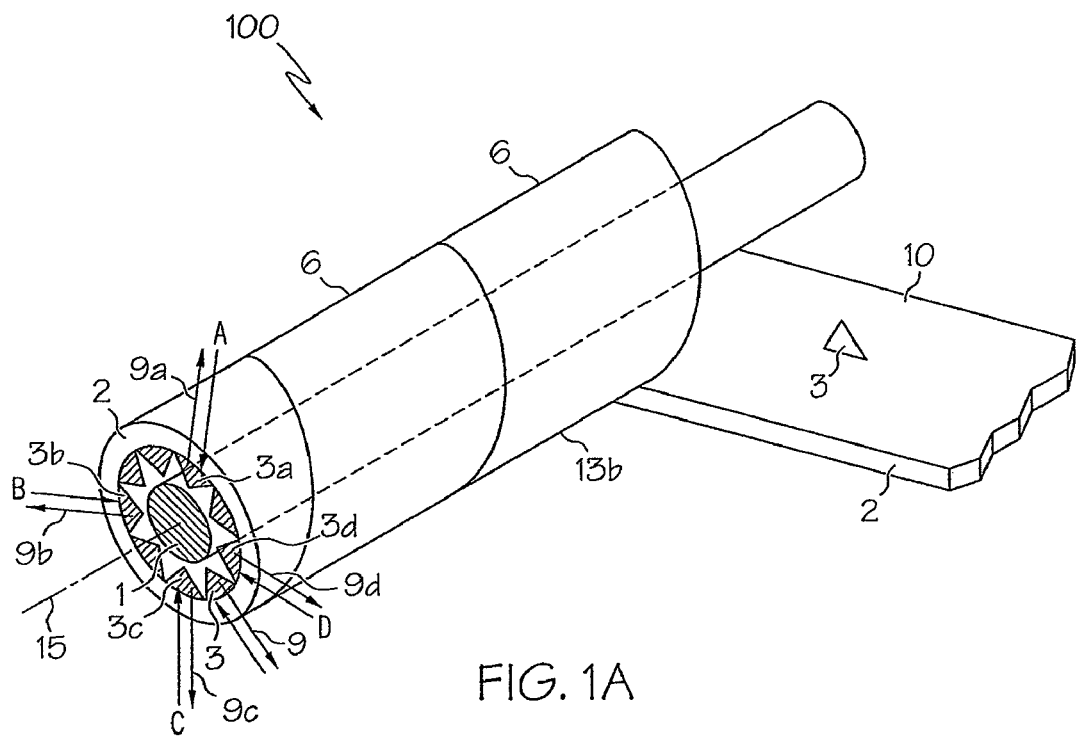
FIG. 1A is an oblique view of a retroreflective structure comprising a strip of retroreflective material according to embodiments of the invention.

Embodiments of the present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

It will be understood that, although the terms first, second, etc. are used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or abutting or overlapping the other element, or intervening elements may be present, or the elements may be spaced apart by a void or gap.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that the terms "helical" and "spiral" can be used interchangeably herein.

It will be understood that the terms "helix," "helical," and variations thereof as used herein include a helix or helical object in the geometric sense. In particular, a helix or helical object can have loops, also referred to herein as winds, that are at a constant distance apart from each other, and can have a constant diameter. In addition, for purposes of the present specification as used herein, a helix or helical object can have loops that abut each other, loops that overlap each other, or loops that are spaced apart from each other by a distance that can vary, or loops of varying diameters, but are generally of a helical or spiral shape or configuration.

It will be understood that the term "corner cube," as used herein for purposes of the present description, can also be referred to as a "corner cube prism" or "prism."

Figure 1B:
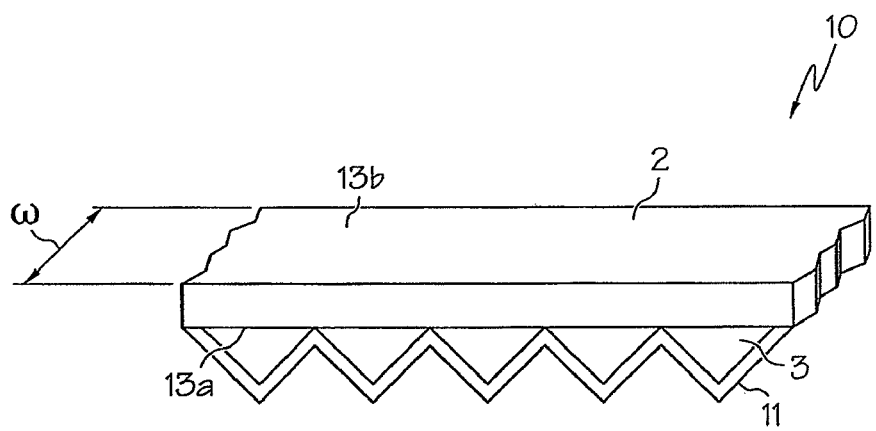
FIG. 1B is a close-up illustrative view of an embodiment of a strip of retroreflective material of FIG. 1A.

FIG. 1A is an oblique view of a retroreflective structure comprising a strip of retroreflective material according to embodiments of the invention. FIG. 1B is a close-up illustrative view of an embodiment of the strip of retroreflective material of FIG. 1A.

The retroreflective structure 100 comprises a strip of retroreflective material 10. In an embodiment, the retroreflective material 10 comprises a body portion, or substrate, 2, and a plurality of retroreflective optical elements 3. The retroreflective structure 100 extends along a longitudinal axis 15. The strip of retroreflective material comprising the body portion 2 and the optical elements 3 extends along a helical path 6 that is about the longitudinal axis 15. For purposes of the present specification, the term "longitudinal axis" should not be construed as being limited to a linear, or straight, axis, but rather allows for flexibility in the core 1, or in the retroreflective structure itself, such that the "longitudinal axis" 15 of the retroreflective structure 100, while generally elongated, can have curves, or bends, along its length.

In an embodiment, the body portion 2 has a first side surface 13a and a second side surface 13a. In an embodiment, the optical elements 3 are disposed on at least one side surface of the body portion 2, i.e., at least one of the first side surface 13a and the second side surface 13b. In an embodiment, the optical elements 3 are positioned between the body of material 2 and the longitudinal axis 15, wherein electromagnetic energy penetrates the second side surface 13b of the body of material 2, and is retroreflected by the optical elements 3 through the second side surface 13b. In another embodiment, the optical elements 3 are positioned between the body of material 2 and a core or hollow core, wherein electromagnetic energy penetrates the second side surface 13b of the body of material 2, and is retroreflected by the optical elements 3 through the second side surface 13b.

In another embodiment, the optical elements 3 are formed on both side surfaces 13a, 13a, of the body portion 2. In other embodiments, strips of first and second retroreflective materials can be attached to each other, back-to-back, as illustrated at least at FIGS. 2A and 2B. Alternatively, the optical elements 3 can be fully or at least partially embedded in the body portion 2. Accordingly, the optical elements 3 are positioned along the helical path 6, so as to receive electromagnetic energy 9 from a source, for example, a source of optical energy, or a light source. As shown in FIG. 1A, the source can be located at a remote position that permits the source to direct a beam of electromagnetic energy 9, for example, electromagnetic energy at optical wavelengths or light wavelengths, at the retroreflective structure 100. For purposes of the present specification, the term "light wavelengths" and "optical wavelengths" include wavelengths in the optical spectrum including visible and non-visible light, infrared, ultraviolet, and other wavelengths neighboring the optical spectrum.

In an embodiment, the retroreflective material 10 is helically configured about the core 1 such that the optical elements are positioned adjacent, or proximal to, the core 1. In embodiment, the optical elements 3 comprise other retroreflectors, such as glass beads, cats' eyes, or diffractive lenses, wherein the body portion 2 of retroreflective material 10 positioned adjacent, or proximal to the core 1, and the at least one of the glass beads, cats' eyes, and diffractive lenses are positioned on an outer surface of the reflective structure 100.

In an embodiment, the optical elements 3 are arranged in a periodic array, and are along the helical path 6, to retroreflect electromagnetic energy that is sourced from a range of angular orientations about the longitudinal axis 15. For example, as shown in FIG. 1A, at location A, electromagnetic energy 9a is directed at the retroreflective structure 100 by a source, for example, a light source. A first retroreflective optical element 3a in a first position along the helical path 6 receives the electromagnetic energy 9a and retroreflects the electromagnetic energy back to location A. At location B, a source directs electromagnetic energy 9b at the retroreflective structure 100, wherein a second retroreflective optical element 3b in a second position along the helical path 6 receives the electromagnetic energy 9b and retroreflects the electromagnetic energy 9b back to location B. Similarly, at location C, a source directs electromagnetic energy 9c at the retroreflective structure 100, wherein a third retroreflective optical element 3c in a third position along the helical path 6 receives the electromagnetic energy 9c and retroreflects the electromagnetic energy 9c back to location C, and at location D, a source directs electromagnetic energy 9c at the retroreflective structure 100, wherein a second retroreflective optical element 3d in a fourth position along the helical path 6 receives the electromagnetic energy 9d and retroreflects the electromagnetic energy 9d back to location D. In an embodiment, the electromagnetic energies 9a, 9b, 9c, and 9d penetrate the second surface 13b of the body of material 2, and is retroreflected by the retroreflective optical elements 3a, 3b, 3c, and 3d, respectively, back through the second surface 13b. Thus, in this example, the retroreflective optical elements 3a, 3b, 3c, 3d positioned along four different positions on the helical path 6 are shown as retroreflecting electromagnetic energy 9a, 9b, 9c, 9d, respectively, sourced from various positions that are at a range of angular orientations that, collectively, are up to 360 degrees about the longitudinal axis 15 of the retroreflective structure 100. Each of the plurality of optical elements 3 in the retroreflective structure 100 can receive and retroreflect electromagnetic energy.

The abovementioned example illustrates that the retroreflective structures and methods of forming the same as described in the present specification are different than conventional retroreflectors, which, as described above, include non-retroreflecting edges. In particular, the limitations associated with conventional approaches are overcome by embodiments of the present invention since the retroreflective structures in connection with embodiments of the present invention can retroreflect electromagnetic energy directed from a range of angular orientations about the longitudinal axis of the structure back to, and only to, the point of origin of the source of electromagnetic energy.

In an embodiment, the optical elements 3 are corner cubes, such as those disclosed in U.S. patent application Ser. No. 12/040,243, filed Feb. 29, 2008, by Robert N. Nilsen, entitled "Two-Sided Corner-Cube Retroreflectors and Methods of Manufacturing the Same," the content of which is incorporated herein by reference in its entirety. In another embodiment, the corner cubes can be open-faced corner cubes. In other embodiments, the optical elements 3 can be reflective optical micro structures, such as corner cubes, linear prisms, gratings, and resonant surfaces, which can include surfaces that produce iridescent colors by constructive interference of light. In an embodiment, a plurality of retroreflective elements 3 can be arranged on the body portion 2 in an array configuration, for example, a periodic array, wherein the retroreflective optical elements 3 of similar size and orientation, are arranged, for example, in rows and columns.

The retroflective material comprising the optical elements 3 may be positioned about the longitudinal axis 15 in a helical configuration, with the prism tips, or apexes, configured to create a non-retroreflective glitter-effect thread that can also be an abrasive thread. Here, a strip of retroreflective material 10 is helically wound, such that the proud apexes of the optical elements 3 are positioned along the length of the core 1, and face outwardly in a direction away from the core 1, and the body portion 2 of the retroreflective material 10 abuts, or is otherwise proximal to, the core 1. In any of the embodiments described herein, the optical elements 3 do not need to be accurate retroreflectors; nor do they need to have optically perfect retroreflective surfaces. In an embodiment, the optical elements are configured and arranged such that a first portion of the retroreflective material 10 includes apexes of optical elements 3 that are positioned along a length of the core 1, and are oriented in a direction with proud apexes facing the core 1, as shown in FIG. 1A, or, in those embodiments that do not include a core, with proud apexes facing, or oriented toward, the longitudinal axis 15, and a second portion of the retroreflective material 10 includes apexes of optical elements 3 oriented in a direction away from the core 1. This configuration can be achieved by twisting or positioning the retroreflective material 10 during a helical winding step about the core 1 to achieve the desired orientations of the optical elements 3.

Figure 7:
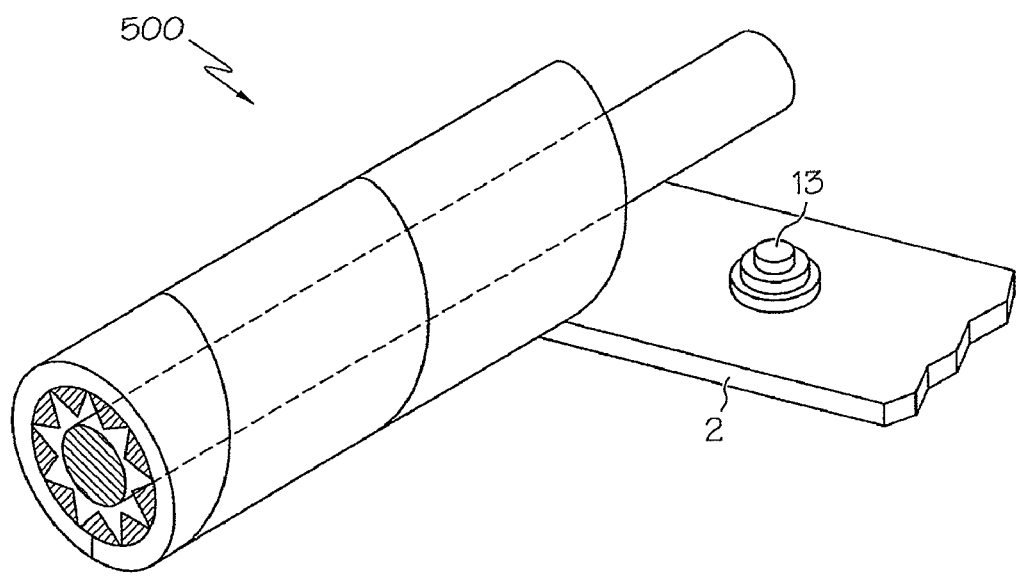
FIG. 7 is an oblique view of a retroreflective structure comprising a resonant material that is along a helical path according to embodiments of the invention.

In an embodiment, the optical elements 3 can be configured to have any number of applicable geometric shapes. In another embodiment, as shown in FIG. 7, the optical elements include resonant structures, such as Aztec structures 13, or other wavelength-specific stepped diffractive structures which resonate light or specific wavelengths and, which can be used in place of, or in conjunction with, corner cubes. In other embodiments, the optical elements 3 can comprise any micro-optical element that diffracts, resonates, reflects and/or refracts wavelengths of electromagnetic energy 9, for example, wavelengths of light, or other wavelengths in the electromagnetic spectrum.

In an embodiment, the optical elements 3 can be either truncated corner cubes, full square sided open-faced corner cubes, or solid corner cubes. The corner cubes can have segmented surfaces to provide a combination of glitter and retroreflective functions. In an embodiment, the corner cubes within the array may be spaced apart from each other to allow flexibility of the reflective material 10, and to otherwise improve bending characteristics of the reflective material 10. In an embodiment, the effective sizes of the corner cubes within the array can vary. In an embodiment, the corner cubes comprise facets that are curved. In another embodiment, other geometric shapes, such as glass beads, cats' eyes, or diffractive lens elements, or other shapes known to those of skill in the art as permitting reflection or retroreflection, can be used. In an embodiment, the corner cube facet dihedral angles are varied to adjust the retroreflected light distribution. In an embodiment, the corner cubes are parallel-walled corner cube structures, for example of the type disclosed in U.S. patent application Ser. No. 12/040,243, filed Feb. 29, 2008, by Robert N. Nilsen, entitled "Two-Sided Corner-Cube Retroreflectors and Methods of Manufacturing the Same," incorporated herein by reference above in its entirety.

In an embodiment, the optical elements 3, for example, corner cubes 3, can be formed and attached to the body portion 2, or molded into the body portion 2, or embossed into the body portion 2. The body portion 2 provides a smooth surface upon which the optical elements 3 can attach. In an embodiment where the optical elements 3 include a prism element having a window side and a facet side, the optical elements 3 are attached to the body portion 2 at the window sides of the prism elements. In various embodiments, the optical elements 3 can be laminated to the body portion 2 with a transparent adhesive, or the optical elements 3 can be cast directly onto the body portion 2 using a formulation which bonds to the body portion 2 as it is cured.

The body portion 2 and the optical elements 3 can be formed of materials known to those of skill in the art. In an embodiment, the optical elements 3 comprise a polymer that is selected from a variety of polymers, which include the polymers of urethane, acrylic acid esters, cellulose esters, ethylenically unsaturated nitrile, hard epoxy acrylates, and other polymers including polycarbonates, polyesters, acrylics, styreneacrylonitrile, and polyolefins, acrylated silanes and hard polyester urethane acrylates. In other embodiments, the polymer can comprise biodegradable materials. In another embodiment, the optical elements 3 are formed of a thermoset material. In other embodiments, the body portion 2 and/or optical elements 3 comprise materials that include properties such as wavelength selectivity, color, fluorescence, phosphorescence, and other application-specific properties.

In an embodiment where the optical elements 3 comprise corner cubes, each corner cube comprises a plurality of reflecting facets, for example, three reflecting facet sides. The facets can be of a same or similar size, or at least one of the facets can be different in size than other facets of the corner cube structure, and can be of any geometric shape. As described above, the corner cube prisms have a window side and a facet side and, in an embodiment, are attached to at least one surface of the body portion 2. The corner cubes may also be directly molded into the surface of the body portion 2. In an embodiment, sheeting that includes the corner cube prisms can be produced on polyester film, having thicknesses ranging from 0.001 to 0.020 inches in thickness. In an embodiment, the material used to form the prisms can be an acrylic cured resin. The prisms can be of different sizes and types, for example, ranging from 0.0001 to several thousandths of an inch on center, and can have geometries that are tilted, off axis and can even be of different sizes, geometries, and orientations on the same sheet. In other embodiments, a retroreflective sheeting comprises arrays of corner cubes, ranging from 0.002-0.010 inches on center, or the distance between apexes of the corner cubes within an array. In other embodiments, a thickness of the retroreflective material 10, including the body of material 2 and the optical elements 3, ranges from 0.003 inches to 0.012 inches.

Referring to FIG. 1B, in an embodiment, a highly specular, optical or reflective coating 11 can be applied to the facets of the optical elements 3. In an embodiment, the reflective coating 11 comprises a thin layer of reflective material, such as metal, which has optical properties known to those of skill in the art, such as an optical constant that results in high reflectivity in the ultraviolet (UV) visible, infrared (IR), and longer-wavelength regions of the electromagnetic spectrum. In one embodiment, the reflective coating 11 comprises aluminum;

however, any other metal or metals, alloys, or other retroreflective materials can be used. Accordingly, in the case where the optical elements comprise corner-cube prisms, the facets of the corner cube prisms may be aluminum metalized; however, other metals such as silver, gold, copper, or many variations and combinations of metals can be deposited on the prisms to provide retroreflection and protection. In an embodiment, the reflective coating can be wavelength-selective, so that a first predetermined wavelength of the electromagnetic energy passes through the reflective coating, and a second predetermined wavelength of the electromagnetic energy is retroreflected. Coatings which are transparent to visible light can be used, or optionally, coatings transparent to light at other wavelengths such as infrared (IR) or ultraviolet (UV) wavelengths can be used. In an embodiment, one top coat or several top coats of clear or color coatings can be applied to the outer surface of the body portion 2 for various purposes, including colorization, UV protection, abrasion resistance, wavelength selectivity or the like. The coating or coatings can be between the optical elements 3 and the body portion 2 or be on an outer surface 13b of the body portion 2. This feature is beneficial over conventional retroreflective fibers, yarns, and the like, which do not include reflective coatings or wavelength-selective transparent coatings, such as color coatings on their retroreflectors, which further limits retroreflective performance.

The presence of a reflective coating 11 on the corner cube reflecting facets is optional, and is not required.

In an embodiment, a color coating can be applied to the optical elements 3 to improve retroreflective performance, and can be used for aesthetic purposes. In an embodiment, the color coating can be a wavelength-selective transparent coating. In an embodiment, the optical elements 3 or the body portion 2 can be treated to include fluorescing colors. In an embodiment, the strip of retroreflective material 10 includes a top layer of film that provides a retroreflective color. In an embodiment, the body portion 2 is colored. It is also preferable that, for some applications where glitter is not desired, if retroreflective optical elements, for example, corner cubes, are coated with a reflective coating, the reflective coating may be coated with a suitable matte color coating to reduce the reflection from the back side of the corner cubes.

In an embodiment, the rear surface or back of the corner cubes of the metalized corner cube sheeting at layer 11 can be coated with a solid color such as a fabric-matching color or a fluorescent color so that when the material is slit, helical fibers, for example, helical fibers with no core, can be formed about the longitudinal axis, such that a portion of the fiber that faces a top surface of a product is either retroreflective, or colored.

In an embodiment, as shown in FIG. 1B, the optical elements 3 are attached to the first side surface 13a of the body portion 2, and the second side surface or outer surface 13b can be either smooth or textured, for example, micro-textured. The surface of the reflective material 10 does not abrade textile equipment or wear down fabrics, as compared to conventional retroreflective materials that include glass bead retroreflectors.

In an embodiment, a random micro-texture such as a random moth-eye texture (not shown) is present on the second side surface 13b of the body portion 2 to improve light transmission through the retroreflective material 10. The random micro-texture can provide anti-reflection features, and improve transmission of longer wavelengths of light, but can appear as a matte finish to the unaided eye, whereby the gloss appearance of the finished retroreflective material is reduced or eliminated.

In an embodiment, the coating 11 can be a random micro-texture coating. A color or wavelength selective coating may also be applied to the outer surface 13b of the body portion 2. In an embodiment, the body portion 2 can contain a color or wavelength selective coating or wavelength-selective dye or pigment, depending on the material used to form the body portion 2. The random micro-texture coating can include the color. In an embodiment, the color or wavelength selective coating may be applied as a layer between the body portion 2 and the optical elements 3. In an embodiment, the color or wavelength selective coating can be applied on a surface of, or can be in a second layer above the body portion 2. This second layer can be attached to the body portion 2 by an adhesive, such as an optical-grade adhesive.

In an embodiment, electromagnetic radiation retroreflects by total internal reflection from facets of the corner cube prisms. In other embodiments, electromagnetic radiation reflects from, or refracts through, surfaces of the body portion 2.

In various embodiments, the core 1 about which the retroreflective material 10 is formed can comprise different materials, including metal wire, plastic coated electrical wire (such as the wires used in houses, cars or even power lines), fabric type textile threads of all types (yarns, strings, etc.), and various polymer threads, for example, fishing line of various strengths. In another embodiment, a core 1 comprising metal wire or electrical wire can be used to transmit electronic information or provide electrical power. In an embodiment, the core 1 can be a hollow tube, formed of metal, polymer, or other materials. In an embodiment, the core 1 can be a glass or polymer fiber optic cable, wherein the core 1 can transmit optical signals, for example, voice, data, video, or light for illumination purposes. In other embodiments, the core 1 can comprise glass, ceramic, polymer, textile, or metal wire.

In an embodiment, the core 1 can comprise a non-clad fiber optic light-piping core that permits light to be provided to the core, and emitted at sharp bends in the core, or at surface imperfections that are purposely introduced into the fiber at regular or random intervals. The non-clad fiber optic light piping core may be helically positioned, or otherwise introduced, around a second core in combination with a micro structured optical thread or by itself to provide a fiber including the retroreflective structures described herein that not only retroreflects electromagnetic energy, but can also emit light when a source of light, for example, a light emitting diode (LED) is coupled to the fiber. In an embodiment, the source of light can may be coupled to at least one end of the fiber. In another embodiment, the source of light can be positioned along the length of the fiber.

In an embodiment, the core 1 can have a diameter that ranges from 0.002-0.012 inches or greater. In another embodiment, the core 1 comprises a metal wire, which has a diameter that is less than 0.001 inches. In another embodiment, the core 1 comprises a polymer, which has a diameter that is less than 0.005 inches.

In an embodiment, the ratio of the diameter of the core 1 to the width (w) of the strip of retroreflective material 10 can be adjusted to provide different degrees of helix winding. For example, if the core diameter is small compared to the retroreflective material width, the retroreflective material 10 is positioned or contoured about the core 1 such that the top surface of the retroreflective material 10 is concave in shape, and the helical loops of retroreflective material can abut each other. On the other hand, if the core diameter is large compared to the width of the strip of retroreflective material, it is easier to form gaps or distances between each helical loop, and the loops of the wound retroreflective material 10 will not abut or overlap each other.

Figure 3A:
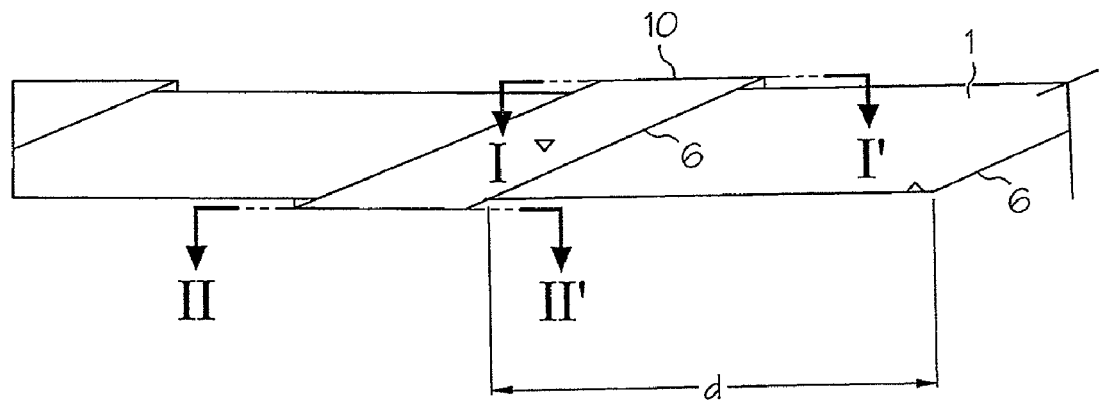
FIG. 3A is a sectional view of the retroreflective structure shown in FIG. 1A having helical loops that are separated from each other according to embodiments of the invention.
Figure 3B:
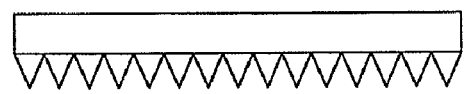
FIG. 3B is a sectional view of a strip of retroreflective material, taken along line I-I' shown in FIG. 3A.
Figure 3C:
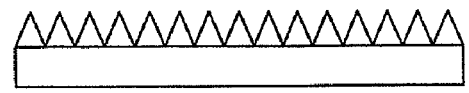
FIG. 3C is a sectional view of a strip of retroreflective material, taken along line II-II' shown in FIG. 3A.

Accordingly, in an embodiment, as shown in FIG. 1A, the retroreflective material 10 is constructed and arranged to include a plurality of helical loops that abut each other. In another embodiment, as shown in FIGS. 3A-3C, the retroreflective material 10 is constructed and arranged to include a plurality of helical loops 6 that are separated from each other by a predetermined distance (d). In an embodiment, the distances between adjacent helical loops relative to the longitudinal axis can be the same or different. For example, the first distance between a first helical loop and a neighboring second helical loop can be the same as a second distance between a third helical loop and a neighboring fourth helical loop. Alternatively, the first distance between a first helical loop and a neighboring second helical loop can be different than a second distance between the third helical loop and a neighboring fourth helical loop. In this manner, the distance d between neighboring loops, or winds, of the helically configured retroreflective structure can vary at different positions along the longitudinal axis 15 of the core 1. In an alternative embodiment, the neighboring loops or winds of the helically configured strip of retroreflective material 10 can overlap each other.

In an embodiment, a strip of retroreflective material 10 having a narrow width (w), ranging from 0.008 to 0.040 inches, for example, 0.014 inches, can be helically positioned about a yarn having a diameter, for example, of 0.050 inches, wherein the strip of retroreflective material will at least partially embed in the yarn. However, in view of these dimensions, if the helical winds of the strip of retroreflective material are spaced apart from each other by approximately 0.030 inches, the texture of the yarn, and the appearance of the yarn, are not changed, even if the yarn is subsequently knitted, weaved, and the like, into to a resulting product, for example, a knitted or weaved fabric.

In an embodiment, at least one strip of retroreflective material 10 comprising the body portion 2 and optical elements 3 is wound about the core 1 along a helical path, for example, as shown in FIG. 1A. In this manner, FIG. 1A further illustrates that the body portion 2 can be positioned as a top film 2 in the helical configuration.

In an embodiment, two or more strips of retroreflective material can be wound in a first direction around the core, and positioned along a same or similar helical path.

Figure 8:
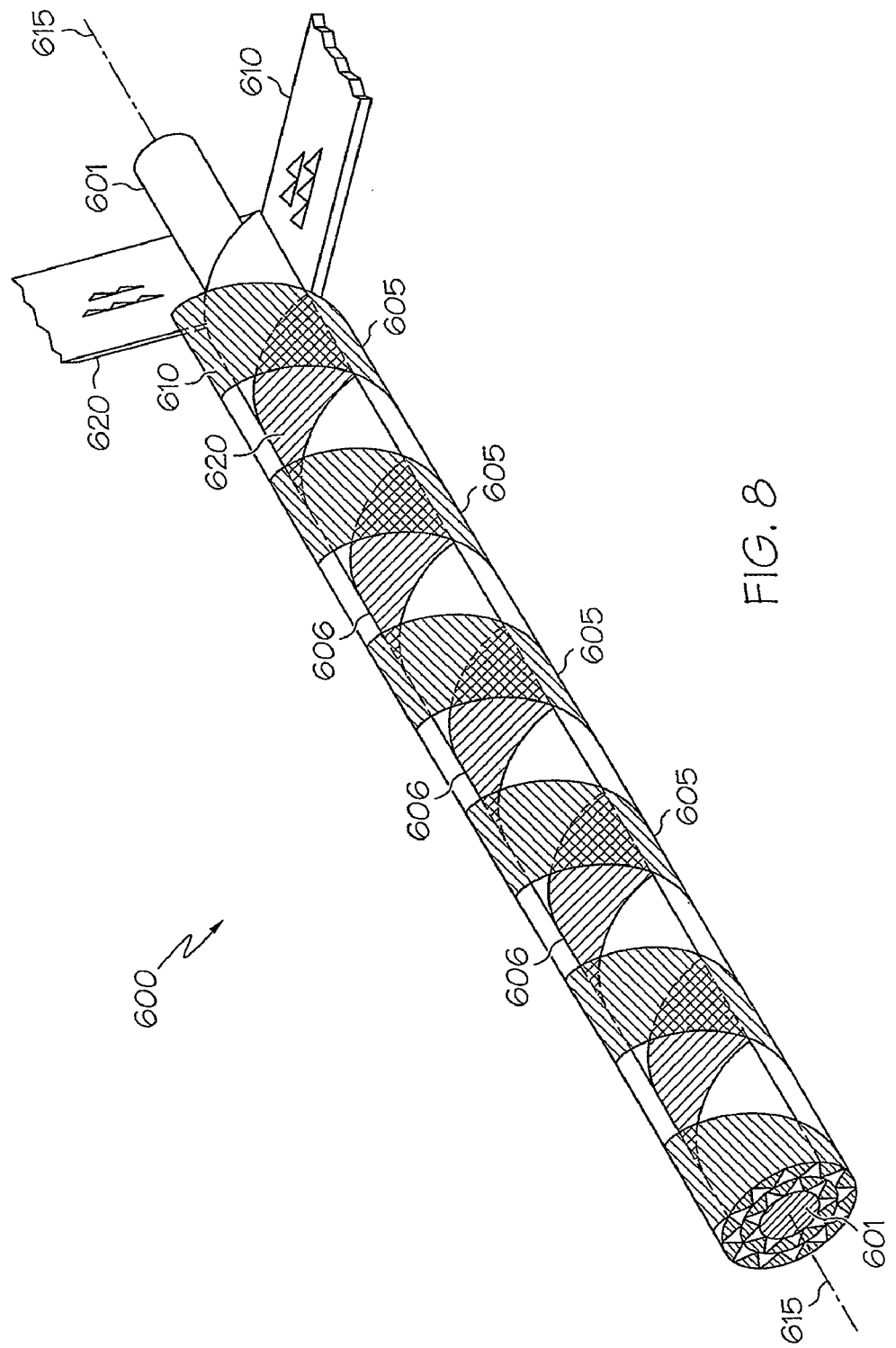
FIG. 8 is an oblique view of a retroreflective structure comprising two strips of retroreflective material according to embodiments of the invention.

In other embodiments, as shown, for example, shown in FIG. 8, a retroreflective structure 600 comprises two or more strips of retroreflective material that can be wound in different directions about a core 601, for example, in clockwise and counterclockwise orientations, respectively, or in left-handed and right-handed helices, respectively. For example, as shown in FIG. 8, the retroreflective structure 600 is along a longitudinal axis 615, wherein the retroreflective structure 600 comprises a first strip of retroreflective material 650 that is positioned along a first helical path 605, and a second strip of retroreflective material 660 that is positioned along a second helical path 606, oriented opposite the first helical path 605, for example, in a criss-crossed pattern.

Returning to FIG. 1, in an embodiment, the body portion 2 can be heat set to raise the temperature of the body portion 2 slightly above its glass transition temperature, and then cooled as the finished material, i.e. the reflective structure 100, is wound onto a spool. During the heating step, the temperature is slightly higher than a glass transition temperature. In this manner, upon cooling, the helix shape is retained and the risk of damage to the optical elements 3 is minimized.

In embodiments, the body portion 2 can be heat set with no core. In other embodiments, the body portion 2 can be heat set with a solid or hollow core.

In an embodiment, the strip of retroreflective material 10, which is wound about the core 1 in a helical configuration, includes corner cubes having a pitch, or distance between adjacent corner cubes, that is less than 0.004 inches. In another embodiment, the pitch between corner cubes is approximately 0.002 inches. In other embodiments, smaller-pitch corner cube sheeting can be used, where the diffraction of the light is greater, causing the retroreflected light to spread across wider angles. If the retroreflective helix or spiral wound thread is used to manufacture an entire garment, it is preferable to use small-pitch corner cubes so that any light reflected from the garment is not so bright as to be blinding to a viewer of the retroreflected light. Other characteristics of the body portion, such as the curvature and stretching of the helix or spiral wound body portion 2, can also contribute to a wider distribution of retroreflected light.

In an embodiment, the retroreflective material 10 comprises a second polymer film that is laminated to the strips of retroreflective material 10 in order to provide additional retroreflected-light management properties. The second polymer film can be formed before or after the optical elements 3 are formed on or otherwise applied to the strips of retroreflective material 10. The second polymer film operates to create areas of differing entrance and observation angle retroreflectivity performance. In an embodiment, the second polymer can be a clear polymer that is used to fill in areas of an open-faced structure in a printed pattern. A clear cover film can then be applied to the structure. The clear printed areas can retroreflect electromagnetic energy at angles that are significantly larger than the unfilled corner cube areas, and therefore, can be used to reflect a different message to a viewer positioned at narrower viewing angles than to a viewer positioned at wide viewing angles. There are useful applications for this feature, since retroreflected light patterns with the viewer located on a same or similar axis as a light source may contain different information than a retroreflected light pattern with the viewer located several degrees off the axis with respect to the light source.

In an embodiment, the retroreflective material 10 can include printed micro-windows or micro-windows in a second polymer film on the body portion 2, which allow light to pass through the second polymer film and body portion 2 that is then retroreflected by the optical elements 3, for example, corner cubes. The area of the window pattern can be determined such that electromagnetic energy, for example, light, will scatter from the opaque printed inks or dies, or opaque polymer film. In an embodiment, the printed area can be a selective transmission printed ink, which will allow some electromagnetic energy to pass through the ink and be retroreflected by the corner cube prisms. In an embodiment, the micro-windows are of a width or diameter that is at least three times the corner cube pitch.

In some embodiments, the thickness of the body of material 2 is approximately 0.002 inches. In other embodiments, the thickness of body of material 2 can be greater than or less than 0.002 inches.

In some embodiments, the height of corner cube prisms is approximately 0.003 inches. In other embodiments, the height of corner cube prisms is greater than or less than 0.003 inches.

In some embodiments, the diameter of the helix-wound thread is approximately 0.015 inches to 0.020 inches. In other embodiments, the diameter of the helix-wound thread, which comprises a core and at least one strip of retroreflective material helically positioned about the core, is greater than or less than 0.015 inches to 0.020 inches.

In an embodiment, as shown in FIG. 1A, and as described above, the optical elements 3 can retroreflect electromagnetic energy sourced from a range of angular orientations about the structure 100, for example, up to 360 degrees about the core 1.

Figure 2A:
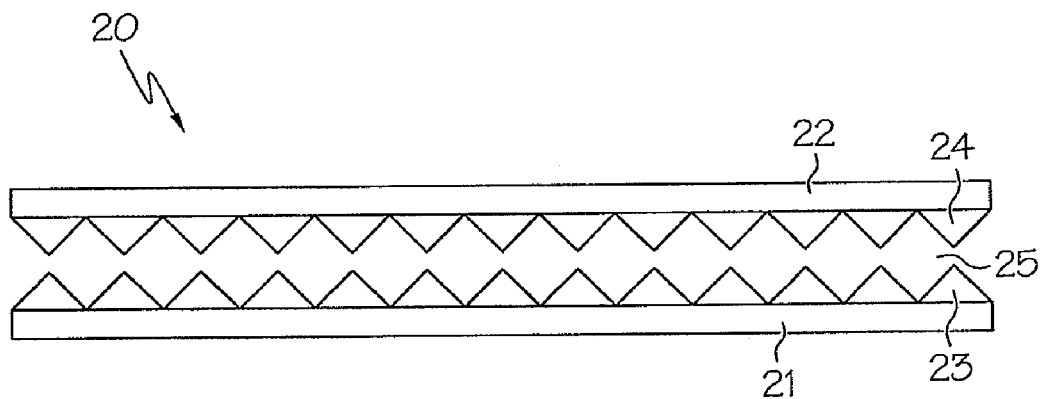
FIG. 2A is a sectional view of a two-sided, back-to-back retroreflective structure according to embodiments of the invention.
Figure 2B:
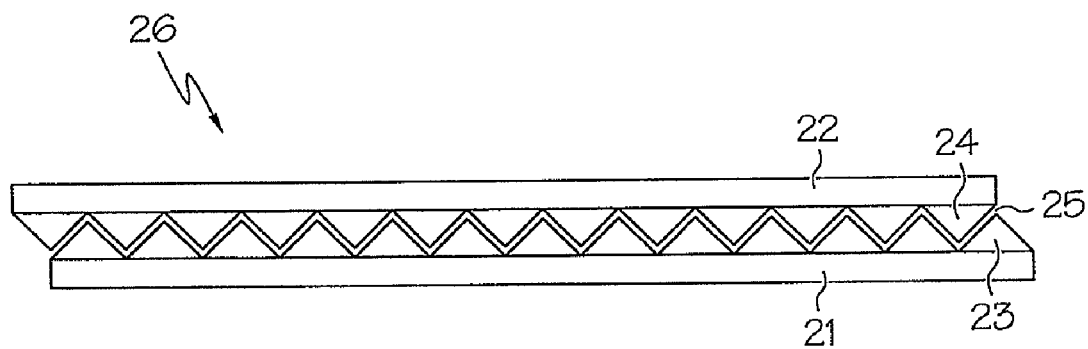
FIG. 2B is a sectional view of a two-sided, back-to-back retroreflective structure according to other embodiments of the invention.

FIG. 2A is a sectional view of a two-sided, back-to-back retroreflective structure according to embodiments of the invention. FIG. 2B is a sectional view of a two-sided, back-to-back retroreflective structure according to other embodiments of the invention. As shown in FIGS. 2A and 2B, a strip of two-sided composite retroreflective material is formed from two strips of retroreflective material 21, 22 that are laminated back-to-back using an adhesive, and slit, cut or otherwise formed into thinner strips of a two-sided composite retroreflective material 20, which can be helically wound about a core, such as a thread or yarn, wherein both sides of the two-sided composite retroreflective material 20 are retroreflective. A two-sided retroreflective material has the advantage of maintaining an outward facing retroreflective surface if the material twists or tips over during a high speed winding process. In one embodiment, the width of retroreflective material is greater than the thickness of the retroreflective material so that the material conforms to the core.

In an embodiment, as shown in FIG. 2A, the optical elements 23, 24 of each strip of retroreflective material, e.g., corner cubes, are in a back-to-back configuration, such that the proud apexes of the optical elements 23 and 24 face each other, so as to retroreflect electromagnetic energy in opposite directions from each other. In this embodiment, the proud apexes of the optical elements 23 and 24 are aligned with each other. In another embodiment, as shown in FIG. 2B, the optical elements 23 and 24 are in a nested configuration so that the proud apexes of the first strip of retroreflective material 21 are aligned with the recessed apexes of the second strip of retroreflective material 22. Alternatively, in another embodiment, the proud apexes of the optical elements can be configured to be at positions between the alignment shown in FIG. 2A and the nesting arrangement shown in FIG. 2B. In an embodiment, both strips of retroreflective material 21, 22, can be treated to have a retroreflective color. In another embodiment, the retroreflective color can include fluorescent colors. In an embodiment, an adhesive 25 may be used to bond the two strips of reflective material 21, 22 together.

The resulting strip of composite retroreflective material 20 shown in FIGS. 2A and 2B, in some applications, may be preferable to a single-layer retroreflective material, since, in the event that the composite retroreflective material is improperly formed about a core, such as a thread or yarn, for example, by being misconfigured during the helical winding process, such that one or more optical elements are not properly positioned to effectively retroreflect wavelengths of electromagnetic energy, the presence of optical elements 23, 24 on both sides of the composite retroreflective material 20 can prevent the occurrence of a loss in retroreflectivity. In an embodiment, the optical elements 23 and 24 on each side of the composite material do not need to be of the same size or shape.

Figure 4:
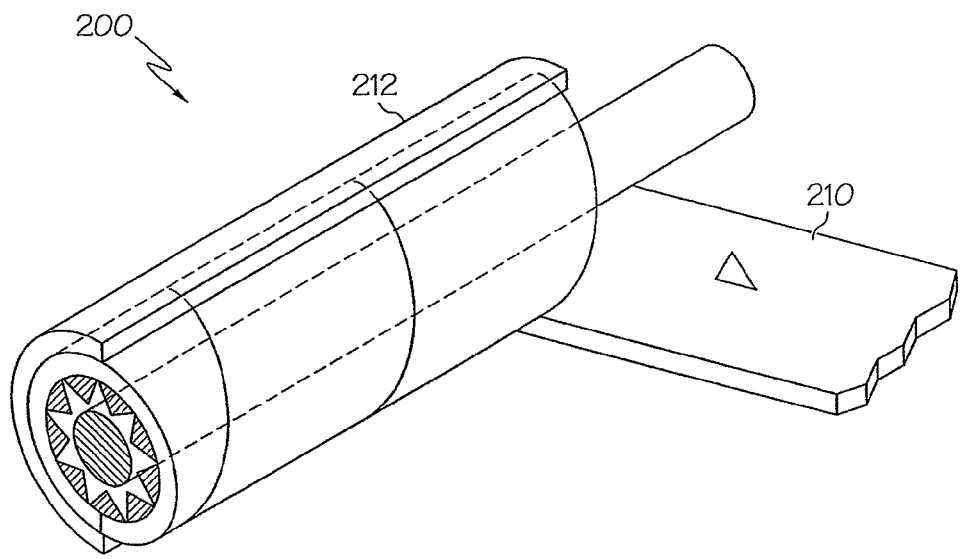
FIG. 4 is an oblique view of a retroreflective structure comprising a cladding that encloses a strip of retroreflective material positioned along a helical path according to embodiments of the invention.

FIG. 4 is an oblique view of a retroreflective structure 200 comprising a cladding 212 that encloses a strip of retroreflective material 210 along a helical path according to embodiments of the invention. As shown in FIG. 4, retroreflective material 210, for example, similar to retroreflective material 10 shown in FIGS. 1A and 1B, can be fed into a cross head extrusion die or a cross head coating die, with or without the core 1, and clad with a cladding 212. In an embodiment, the cladding 212 is formed about the helix wound retroreflective material 210. In one example, the cladding 212 can be extruded to encase the retroreflective material 210. In an embodiment, the cladding 212 can be a polymer. The polymer coating 212 may be a thermoplastic or thermoset coating. The polymer coating may be a wavelength-selective coating. The polymer coating 212 may be used to add a texture to the outer surface of the finished structure.

In an embodiment, the polymer can be a thermal plastic polymer that is extruded through traditional extrusion operations known to those of skill in the art. Alternatively, a thermoset polymer can be extruded or coated onto the surface of the retroreflective helix or spiral wound thread and then cured after the coating is applied.

In an embodiment, the cladding 212 can be of any color but should transmit the wavelength of light of which detection is desired. The color is achieved by including transparent dyes or pigments in the polymer(s) that are used for the cladding. The cladding 212 can also have particles such as glass bead particles or higher temperature polymer particles included in the base polymer to achieve a rough textured or light scattering appearance in the cladding 212.

Figure 5:
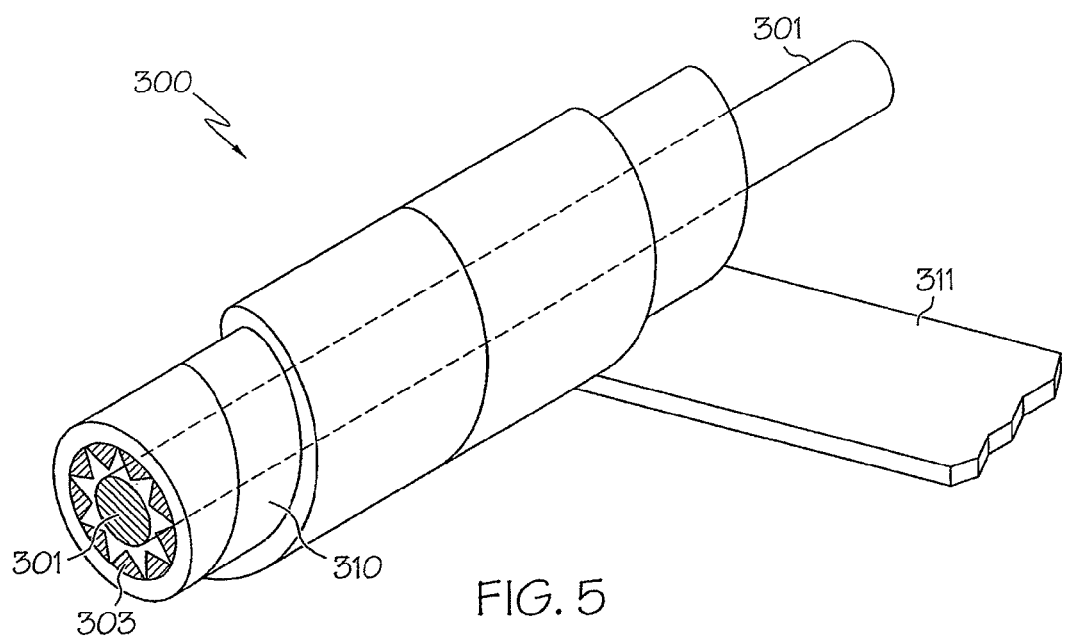
FIG. 5 is an oblique view of a retroreflective structure comprising a strip of retroreflective material positioned along a first helical path and a layer of material positioned along a second helical path, and formed on the strip of retroreflective material according to embodiments of the invention.

FIG. 5 is an oblique view of a retroreflective structure 300 comprising a strip of retroreflective material 310 positioned about a first helical path and a layer of material 311 positioned about a second helical path, and enclosing the strip of retroreflective material 310, according to embodiments of the invention. In an embodiment, the layer of material 311 comprises a polymer, and has properties similar to the second polymer film described above. In other embodiments, the layer of material 311 can comprise a waterproof material, such as polyester or other polymers, permitting the retroreflective material 310 to retain its retroreflective properties, even when the retroreflective structure 300 is wet. In an embodiment, the layer of material 311 at least partially encloses the strip of retroreflective material 310. In another embodiment, the layer of material 311 completely encloses the strip of retroreflective material 310.

In an embodiment, the outer surface of a body portion of the first layer of retroreflective material 310 can be glossy, and the outer surface of the layer of material 311 can have a random texture or designed micro structure on the outer surface of the first strip of retroreflective material 310, which can be wound or otherwise helically positioned about the surface of the underlying first layer 310, which comprises a plurality of optical elements, for example, corner cubes 303. In an embodiment, the two layers 310, 311 can be wound about a core along a same or similar helical path, or helically configured without a core, along a longitudinal axis. In other embodiments, the first and second layers can be wound about a core 301 along different helical paths, for example, in a criss-crossed configuration. In an embodiment, an optical-grade adhesive may be used to bond the two layers 310, 311 together.

Figure 6:
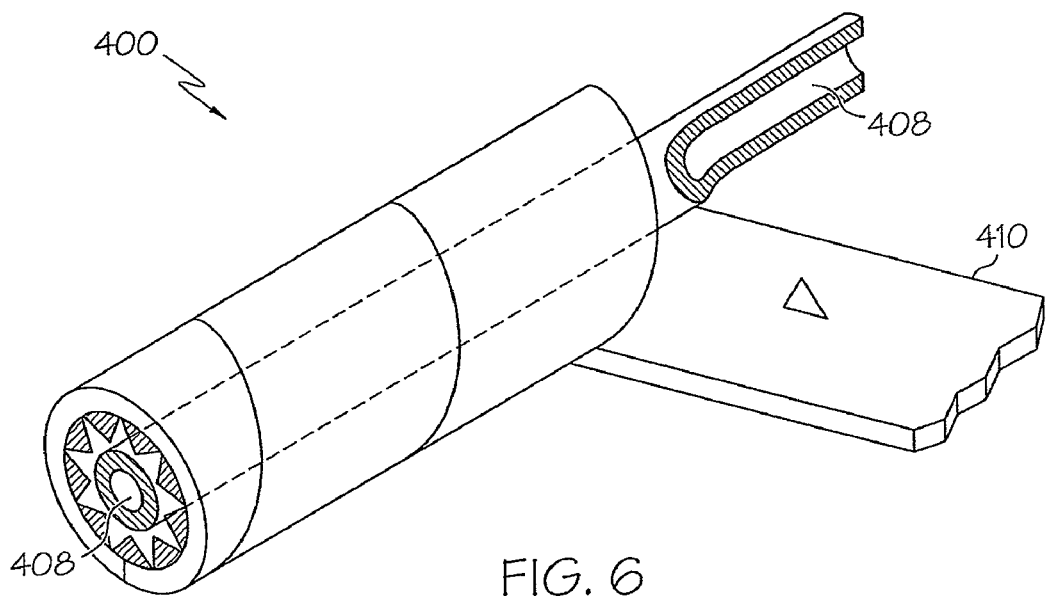
FIG. 6 is an oblique view of a retroreflective structure comprising a hollow core according to embodiments of the invention.

FIG. 6 is an oblique view of a retroreflective structure 400 comprising a hollow core 408 according to embodiments of the invention. The hollow core 408 confers buoyancy properties to the resulting retroreflective structure 400 to more readily float, and, thus, the retroreflective structure 400 can be cut into a plurality of smaller fibers that float. In an embodiment, a retroreflective structure comprising a hollow core, for example as shown in FIG. 6, when clad with a cladding similar to that shown in FIG. 4, is buoyant when the ends of the structure are sealed. This feature of the invention is beneficial in applications such as the formation of paper products and non-woven fabrics, or the formation of films, and can be used to mark boat paths, submarines, or wreckage in the event of emergencies, or mark emergency landing zones. Other applications include attaching devices including the retroreflective structure 400 to nets or fishing line. The retroreflective structure 400 can comprise a retroreflective material 410, similar to the retroreflective material 10 described with regard to FIG. 1A, which can be formed about the hollow core 408 in a helical configuration.

Figure 9:
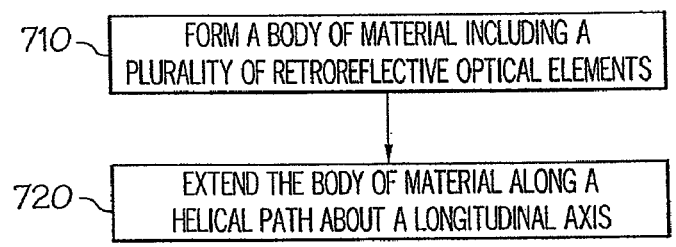
FIG. 9 is a flowchart of steps for forming a retroreflective structure according to embodiments of the invention.

FIG. 9 is a flowchart of steps for forming a retroreflective structure, such as the retroreflective structures shown in FIGS. 1-7, according to embodiments of the invention.

A method of forming the retroreflective structures shown in FIGS. 1-7 will now be described.

In step 710, a body of material including a plurality of retroreflective optical elements is formed. In an embodiment, the body of material can be formed as follows.

Retroreflective sheeting is formed by adding arrays of optical elements, for example, corner cubes, to at least one side of a body of material. The optical elements can be cast, adhered or molded into the body of material, or embossed into the body of material. The retroreflective sheeting can have a length of up to 5000 feet, or more, and can have a width of 18 inches or more.

In various embodiments, the retroreflective structures can be formed according to methods known to those of skill in the art, such as those methods disclosed in U.S. Pat. Nos. 3,689,346 and 4,576,850, the contents of each of which are incorporated herein by reference in its entirety.

In an embodiment, the retroreflective sheeting can have an optional reflective coating applied to the optical elements, for example, to corner cube facets of the retroreflective sheeting, which is applied before the sheeting is cut to the width required for the helical winding step described herein. In another embodiment, a polymer film can be laminated to the top surface of the retroreflective sheeting. The polymer film permits the retroreflective sheeting to have selective wavelength transmission properties, for example, by being provided as a colored polymer film. In other embodiments, the sheeting can be textured or filled with particles to achieve different appearances, or to achieve a desired variation in light distribution. In an embodiment, the laminated film can have a lower melt temperature than the retroreflective body of material so that the outer surfaces of the strips of retroreflective material are wound in a tight abutting helix about the core, may be heated and fused together, or fused to a core. The particles may also be composed of a transparent high index of refraction material to provide light management properties.

Next, after the retroreflective sheeting is formed, a plurality of first strips of retroreflective material are formed from the retroreflective sheeting. In embodiments, the sheet of retroreflective material can be hand-cut, die-cut, slit or guillotined into the first strips. Each first strip has a width, for example, approximately 30 inches.

Next, each first strip is further cut or otherwise formed into a plurality of second strips. Each second strip has a width, for example, approximately 2.5 inches.

Next, each second strip can be further cut into a plurality of third strips. Each third strip has a width, for example, between 0.002 and 0.060 inches. In an embodiment, the third strips of retroreflective material can be wound about a spool. In another embodiment, the third strips of retroreflective material can be adjoined to form longer or wider strips of retroreflective material. In another embodiment, first or second strips of retroreflective material can be connected together to form a two-sided composite retroreflective material, in a manner similar to that described in connection with FIGS. 2A and 2B above.

Next, as shown in step 720 of FIG. 9, the third strips of retroreflective material, which includes the body of material and the retroreflective optical elements thereon, is extended along a helical path about a longitudinal axis, for example, as illustrated in FIG. 1A. In an embodiment, the retroreflective material is helically wound about a core, for example, yarn, which is suitable for use in sewing, weaving or embroidery machines.

In an embodiment, the combination of core material, for example, yarn, and helically wound retroreflective material is formed into a finished material by being wound onto a skein winder, and formed into a skein. The finished material may be of any length, preferably, lengths of greater than 1600 yards. For example, a typical length required to form a hand knit sweater contains approximately 1600 yards of yarn. However, the finished material can have a length less than 1600 yards, depending on factors such as the type of material used to form the core, and the application. Accordingly, a feature of the helically wound retroreflective material is that the retroreflective material can be wound about a thread, yarn, and the like, having a size, spacing between helical winds, color, and other desirable characteristics described herein, that permits the finished material, for example, a garment, to appear to be natural, because the retroreflective material adapts to the overall appearance of the garment, and does not appear to be a glossy retroreflective material.

In one application, the wound material with either a reflective coating on the corner cube facets or without a reflective coating, and either with a cladding layer or without a cladding layer, and either with a core thread or without a core thread, can also be then fed, singularly or multiple stands together, into a chopping machine. These thin threads can be cut into a uniform length, from 0.004 to several inches, forming individual fibers. These fibers can be processed by mixing with paint, applied on top of wet paint, or spread onto a carrier sheet and covered with a topcoat or film and slit into roadway products, or other retroreflective or decorative products. The paint formulation, top coat or film is designed to be transparent to the wavelength of light which must be viewed in the application. The fibers may be mixed with a clear resin and sprayed into a mold to form the top surface of an object, such as a boat hull.

Viewing of the retroreflected light may be done with the unaided eye or with a special sensor depending on the wavelength of light.

In another application, the retroreflective fibers or strands formed in this manner and which have a thermoplastic outer surface can be fused together in a similar manner that nonwoven materials are made. The retroreflective fibers or strands with a thermoplastic or thermoset outer layer may be incorporated into non-woven materials by creating interlinking with the strands of a non-woven material such as a fabric or paper. The stiffness and spiral arc shape of the fibers or strands will provide for the interlinking. The outer edges of the fiber or strands may be formed to be rough or fibrous or flocked or Velcro™ like to increase interlinking properties. The fiber cutting process may be used to make the ends of the fibers sharp, which will assist with the fiber's ability to interlink with other materials and fibers.

The retroreflective spooled material can then be fed into a chopping apparatus and cut to a uniform length, ranging from 0.005 inches to several inches, depending on the application of the now short, uniform fibers. These fibers can then be collected either by gravity feed into a collection box or may be vacuumed into a collection box. Experimentation has produced fibers of substantially similar length, capable of retroreflecting light received from all directions.

In the case where hollow core fibers are used (see, for example, FIG. 6), the chopping operation is designed to also seal the fibers at each end during the cutting process. Sealing can be achieved through heat and pressure with small sealing flat or flange areas designed into the cutting blades. The result is a buoyant retroreflective fiber.

In another application, the resulting fibers can be mixed into a coating, such as transparent roadway paint, and can be applied by spray or other means to produce a retroreflective surface, which may be required for example, in the United States, by federal, state, and local governments, or may be required in other countries. In the case of a roadway, the fibers can be applied by hand or by a machine to the top surface of freshly painted surfaces to add a retroreflective coating to the roadway.

In another application, the retroreflective material can be fed, preferably using several strands at one time, through the nozzle of a fiberglass application gun, and chopped and mixed with fiberglass resin to form a molded material with a high level of retroreflection. This molded material can be used for marine, highway, personal safety or any other number of retroreflective uses.

In another application, the retroreflective material can be fed, preferably using several strands at one time through a chopping nozzle and mixed with a resin mixture of polyurea, a two part system and allowed to cure. The weathering of polyurea and its ability to adhere to metals and concrete when mixed with the retroreflective strands will enhance the nighttime visibility of bridges and concrete roadway barriers.

The clad retroreflective material (for example, as shown in FIG. 4) can also be used to form non woven sheeting by positioning fibers such that they overlap and locally fusing the thermoplastic outer component of the fibers together under heat and pressure. In an embodiment, the retroreflective fibers can be fed through a cross head die in an extrusion machine and a continuous thread or string may be formed of a polymer, such as polyurethane, or many other commonly used materials. This cladding can be applied to give the fiber special optical or color characteristics, while also providing added tensile strength to the fiber.

Figure 10:
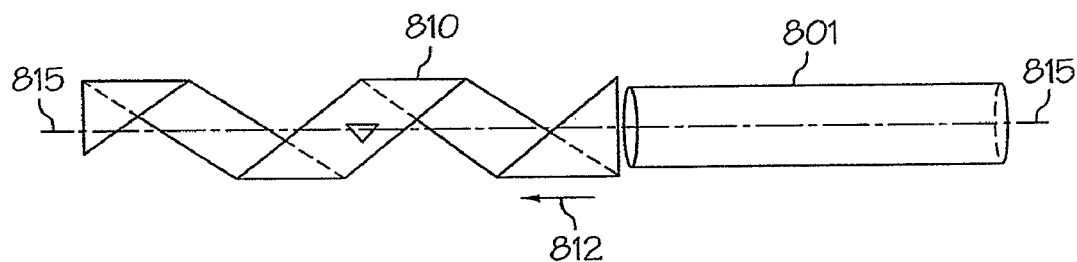
FIG. 10 is a sectional view of a method of forming a strip of retroreflective material having a helical configuration according to embodiments of the invention.

In another application, as described herein with regard to FIG. 10, the core can be removed from the helix or spiral wound reflective material, leaving only the helic or spiral wound ribbon which can then be chopped or cut into small spiral fibers which will have the tendency to cling to objects of all types, in particular, fabrics or other objects with open structures. In an embodiment, the fibers can be chopped or cut at an angle or with a serrated blade to create pointed areas to grab onto other materials. Accordingly, if high tensile strength is not necessary, the retroreflective material can be helically wound without a core, respectively, as described in detail with regard to FIG. 10.

Accordingly, retroreflective fibers, threads, yarns, wires, and the like, when formed including the abovementioned retroreflective structures and methods described herein, can be used in applications such as reflective cloths, fabrics, tapes, tarpaulins, or patches.

FIG. 10 is a sectional view of a method of forming a strip of retroreflective material having a helical configuration according to embodiments of the invention.

A strip of retroreflective material 810 is helically positioned about a core 801, which is along a longitudinal path 815, or axis. Next, the strip of retroreflective material 810 is heat set, by raising the temperature of the retroreflective material 810 slightly higher than its glass transition temperature, and then cooling the material 810 to a temperature that is below the glass transition temperature, preferably prior to chopping the material 810 into fibers. Thus, the strip of retroreflective material 810 maintains its helical shape after being subsequently separated from the core 801. In an embodiment, the retroreflective material 810 comprises optical elements that comprise a thermoset material, and is therefore not affected by the temperature of the strip of retroreflective material 810 during the heating and cooling of the strip of retroreflective material 810. Next, as shown by the arrow 812, the strip of retroreflective material 810 is separated from the core 801. Once the strip of retroreflective material 810 is removed from the core 801, it can be cut into smaller pieces of retroreflective material, which can be used in various applications. In another embodiment, the strip of retroreflective material 810 is cut into smaller pieces prior to removing the core 801.

Accordingly, the retroreflective structures and methods referred to herein can include weaving a retroreflective material with thread or yarn to form a retroreflective fabric. As described above, in some embodiments, the retroreflective material may be formed into fibers for use in coatings, paints and non-woven fabrics or papers. In other embodiments, the fibers may be fed into an injection molding machine to form a retroreflective polymer.

In other embodiments, the retroreflective material can also be mixed with a coating material, such as paint, and applied to a roadway or any other area requiring a reflective paint. In other embodiment, retroreflective fibers may also be included in a polymer film or a reflective tape or retroreflective strands may be applied through a fiberglass gun. The fibers are helical in configuration and may be used with or without the core thread in position.

The devices and methods can also include lengths of thin retroreflective thread or retroreflective fibers, which can be clad using an extrusion machine and coated with various materials, such as polyurethane or other materials to achieve wavelength selectivity, color, fluorescence, phosphorescence and other application specific properties to produce reflective thread for garments and patches with both decorative and safety features.

While embodiments of the invention have been particularly shown and described with references to preferred embodiments thereof, it will be understood by those skilled in the art that various changes in form and details may be made herein without departing from the spirit and scope of the invention as defined by the appended claims.

What is claimed is:

1. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis, wherein at least one retroreflective optical element of the plurality of retroreflective optical elements includes a corner cube structure.

2. The retroreflective structure of claim 1, wherein the plurality of retroreflective optical elements are constructed and arranged to retroreflect electromagnetic energy at optical wavelengths.

3. The retroreflective structure of claim 1, wherein the body of material is constructed and arranged to be at least partially transparent to incident electromagnetic energy.

4. The retroreflective structure of claim 1 further comprising a hollow core along the longitudinal axis, wherein the body of material including the optical elements surrounds the hollow core, and is positioned along the helical path about the core.

5. The retroreflective structure of claim 4, wherein the hollow core comprises a metal or polymer hollow tube.

6. The retroreflective structure of claim 1, wherein the range of angular orientations comprises up to 360 degrees about the longitudinal axis.

7. The retroreflective structure of claim 1, wherein the body of material is treated to have a wavelength-selective color.

8. The retroreflective structure of claim 1 further comprising an upper layer on the body of material and the retroreflective optical elements.

9. The retroreflective structure of claim 8, wherein the upper layer is along a helical path about the longitudinal axis.

10. The retroreflective structure of claim 9, wherein the helical path along which the upper layer is positioned is the same as or similar to the helical path along which the body of material and the retroreflective optical elements are positioned.

11. The retroreflective structure of claim 8, wherein the upper layer has a textured or micro-structured surface.

12. The retroreflective structure of claim 1, wherein neighboring helical loops of the body of material abut or overlap each other.

13. The retroreflective structure of claim 1, wherein the plurality of retroreflective optical elements are positioned between the body of material and the longitudinal axis so that incident electromagnetic energy penetrates the body, is retroreflected by the plurality of retroreflective optical elements, and exits the body as retroreflected electromagnetic energy.

14. The retroreflective structure of claim 1, wherein the retroreflective structure is heat set.

15. The retroreflective structure of claim 1, wherein the retroreflective structure is heat set to elastically retain a helix shape.

16. The retroreflective structure of claim 15, wherein the optical elements comprise a thermoset material, wherein retroreflective optical properties of the optical elements are retained when the retroreflective structure is heat set.

17. The retroreflective structure of claim 1 further comprising a polymer film that is laminated to a top surface of the body of material.

18. The retroreflective structure of claim 17, wherein the retroreflective structure along the helical path tightly abuts a core that is along the longitudinal axis.

19. The retroreflective structure of claim 17, wherein the polymer film is a wavelength-selective polymer film.

20. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; and further comprising at least one resonant structure positioned on the body of material.

21. The retroreflective structure of claim 20, wherein the at least one resonant structure is positioned on a first side of the body of material and the retroreflective optical elements are positioned on a second side of the body of material that is opposite the first side.

22. The retroreflective structure of claim 20, wherein the at least one resonant structure and the retroreflective optical elements are positioned on a same side of the body of material.

23. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; wherein the plurality of retroreflective optical elements include at least one of corner cubes and cats' eyes.

24. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; and further comprising a reflective coating on at least one of the retroreflective optical elements.

25. The retroreflective structure of claim 24, wherein the reflective coating is a wavelength-selective optical coating.

26. The retroreflective structure of claim 24, wherein the reflective coating is in direct contact with the retroreflective optical elements.

27. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; and further comprising a core along the longitudinal axis, wherein the body of material including the optical elements is positioned along the helical path about the core.

28. The retroreflective structure of claim 27, wherein the core comprises a metal wire, polymer fiber, or fabric type textile fiber.

29. The retroreflective structure of claim 27, wherein the core comprises a non-clad fiber-optic light-piping thread.

30. The retroreflective structure of claim 27, wherein the plurality of retroreflective optical elements comprise corner cube structures, and wherein the periodic array of plurality of retroreflective optical elements are constructed and arranged so that proud apexes of the corner cube structures are oriented toward the core.

31. The retroreflective structure of claim 27, wherein a first side of the body of material comprises a smooth surface that abuts the core and wherein at least one retroreflective optical element of the plurality of retroreflective optical elements is an open-faced corner cube positioned on a second side of the body of material that is opposite the first side.

32. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; and further comprising a cladding on the body of material.

33. A retroreflective structure comprising:
a body of material extending along a helical path about a longitudinal axis; and a plurality of retroreflective optical elements arranged in a periodic array, and positioned along the helical path of the body of material, and constructed and arranged to retroreflect electromagnetic energy directed from a range of angular orientations about the longitudinal axis; and further comprising an upper layer on the body of material and the retroreflective optical elements, wherein the upper layer has a textured or micro-structured surface.

34. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; and further comprising an upper layer on the body of material and the retroreflective optical elements, wherein the upper layer is along a helical path about the longitudinal axis and wherein the helical path along which the upper layer is positioned is different than the helical path along which the body of material and the retroreflective optical elements are positioned.

35. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; wherein neighboring helical loops of the body of material are spaced apart from each other.

36. The retroreflective structure of claim 35, wherein first neighboring loops are spaced apart by a first distance and second neighboring loops are spaced apart by a second distance, wherein the first distance and the second distance are not equal.

37. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; wherein the body of material including the plurality of optical elements comprises at least two strips of retroreflective material, wherein a first strip of retroreflective material is along a first helical path about the longitudinal axis and a second strip of retroreflective material is along a second helical path about the longitudinal axis.

38. The retroreflective structure of claim 37, wherein the first and second helical paths are the same or similar helical paths.

39. The retroreflective structure of claim 37, wherein the first and second helical paths are different helical paths.

40. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; wherein the retroreflective structure comprises a composite retroreflective structure that includes two strips of retroreflective material that are laminated together, back-to-back, wherein unlaminated sides of the two strips of retroreflective materials comprise a first side and a second side of the composite retroreflective structure, so that electromagnetic energy that is incident at either the first side or the second side of the composite retroreflective structure is retroreflected by the structure.

41. A retroreflective structure comprising:
a body of material extending along a helical path about a longitudinal axis; and
a plurality of retroreflective optical elements arranged in a periodic array, and positioned along the helical path of the body of material and constructed and arranged to retroreflect electromagnetic energy directed from a range of angular orientations about the longitudinal axis; wherein the plurality of retroreflective optical elements comprise corner cube structures and wherein the periodic array of plurality of retroreflective optical elements are constructed and arranged so that proud apexes of the corner cube structures are oriented toward the longitudinal axis.

42. A retroreflective structure comprising:
a body of material extending along a helical path about a longitudinal axis; and
a plurality of retroreflective optical elements arranged in a periodic array, and positioned along the helical path of the body of material, and constructed and arranged to retroreflect electromagnetic energy directed from a range of angular orientations about the longitudinal axis; and further comprising an upper layer on the body of material and the retroreflective optical elements, wherein the retroreflective optical elements retroreflect electromagnetic energy when the retroreflective structure is wet.

* * * * *